_Patented Jan. 7, 1941_ 2,228,108

UNITED STATES PATENT OFFICE 2,228,108

SOLVENT

Johan Bjorksten, Chicago, Ill., assignor to Ditto, Incorporated, Chicago, Ill., a corporation of West Virginia No Drawing. Application August 25, 1939, Serial No. 291,899

4 Claims. (Cl. 41—31.6)

The invention relates to solvents and more particularly to solvent mixtures for use in duplicating processes wherein a copy sheet is moistened with the solvent mixture and applied to a master sheet containing characters or a design formed of soluble inks.

The solvents used in the above so-called spirit or direct process duplicating method must be good solvents for duplicating dyes such as the basic water and alcohol soluble dyes commonly used. They must spread instantly and uniformly on the copy paper and they must very rapidly evaporate to such an extent that the dye impression is fixed on the paper and further spreading or blurring is prevented.

Heretofore these conditions could be met only by liquids containing a major percentage of methanol as no other good dye solvent would be at the same time reasonably non-irritant in odor and evaporate sufficiently rapidly to prevent blurring or spreading of the characters. The liquids have also contained minor percentages of ethyl alcohol, water, glycols, and other less rapidly evaporating substances, but heretofore any increase in the content of ethyl alcohol beyond about 50% or any increase in the still less volatile ingredients beyond about 10% have resulted in liquids of undesirable blurring and spreading qualities, due to slow evaporation and consequent spreading of dye.

However, methanol, while otherwise possessing suitable properties, has the great disadvantage of being toxic, so that the operator of a duplication machine using the methanol containing liquids of prior art, when working in a room with mediocre or poor ventilation, will experience more or less severe health disturbances, such as headaches, nausea, etcetera. Therefore, it would be highly desirable to substitute ethyl alcohol for the methanol, which heretofore has not been possible because ethyl alcohol being more slowly evaporating, would cause spreading or blurring of characters.

It has now been found that when ethylene glycol mono-methyl ether ("Methyl Cellosolve") is used in the solvent composition, in quantities from 1½ to 20%, it is possible to vastly increase the ethyl alcohol percentage, and even to entirely substitute ethyl alcohol for the methanol, without causing any impairment of copy results.

The following table gives a preferred formula and a suitable range of proportions:

|  | Preferred | Range |
|---|---|---|
|  | Parts by volume | Parts by volume |
| "Methyl Cellosolve" | 10 | 1½–20 |
| Ethyl alcohol | 87 | 95–70 |
| Water | 3 | 0–10 |
| Methyl alcohol | 0 | 0–10 |

As specific examples of liquids embodying this invention, the following may be given:

I

| | Per cent |
|---|---|
| "Methyl Cellosolve" | 5 |
| Water | 5 |
| Methanol | 5 |
| Ethyl alcohol | 85 |

II

| | |
|---|---|
| "Methyl Cellosolve" | 2 |
| Ethanol | 94 |
| Water | 4 |

While I do not wish to commit myself to any theory with regard to the cause of this unexpected and beneficial effect of "Methyl Cellosolve", it appears probable that the effect may be due to some surface tension effect of the "Methyl Cellosolve" in conjunction with its solvent power for dyes and its rate of evaporation when used with ethanol or to the relatively high viscosity of dye solutions in "Methyl Cellosolve" in conjunction with the other properties mentioned.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A solvent adapted for use in direct process duplication comprising ethyl alcohol, a minor proportion of ethylene glycol mono-methyl ether, and from zero to ten percent of water.

2. A solvent adapted for use in direct process duplicating comprising ethyl alcohol from seventy percent to ninety-five percent by volume and ethylene glycol mono-methyl ether from one and one-half to twenty percent by volume.

3. A solvent adapted for use in direct process duplication consisting of ethyl alcohol, approximately eighty-seven percent by volume, ethylene glycol mono-methyl ether approximately ten percent by volume, and water approximately three percent by volume.

4. A solvent adapted for use in direct process duplication consisting of ethyl alcohol, ethylene glycol mono-methyl ether, water, and methyl alcohol, the ethylene glycol mono-methyl ether, and methyl alcohol being present in minor proportion, and the water being present in not more than ten percent.

JOHAN BJORKSTEN.